(12) United States Patent
Zhang

(10) Patent No.: US 11,875,486 B2
(45) Date of Patent: Jan. 16, 2024

(54) IMAGE BRIGHTNESS STATISTICAL METHOD AND IMAGING DEVICE

(71) Applicant: BEIJING TUSEN ZHITU TECHNOLOGY CO., LTD., Beijing (CN)

(72) Inventor: Yu Zhang, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 446 days.

(21) Appl. No.: 17/240,800

(22) Filed: Apr. 26, 2021

(65) Prior Publication Data

US 2021/0248723 A1 Aug. 12, 2021

Related U.S. Application Data

(63) Continuation of application No. PCT/CN2019/077048, filed on Mar. 5, 2019.

(30) Foreign Application Priority Data

Oct. 26, 2018 (CN) .......................... 201811257211.8

(51) Int. Cl.
*G06T 5/00* (2006.01)
*G06T 5/40* (2006.01)
(Continued)

(52) U.S. Cl.
CPC .............. *G06T 5/009* (2013.01); *G06T 1/20* (2013.01); *G06T 1/60* (2013.01); *G06T 5/40* (2013.01); *G06T 2207/20208* (2013.01)

(58) Field of Classification Search
CPC ... G06T 1/20; G06T 1/60; G06T 2207/20208; G06T 5/009; G06T 5/40; H04N 17/00; H04N 23/70; H04N 5/00
See application file for complete search history.

(56) References Cited

U.S. PATENT DOCUMENTS

2009/0284625 A1* 11/2009 Takemura ................ H04N 5/57
348/254
2010/0303349 A1 12/2010 Bechtel et al.
(Continued)

FOREIGN PATENT DOCUMENTS

CN 104809747 A 7/2015
CN 105282529 A 1/2016
(Continued)

OTHER PUBLICATIONS

International Application No. PCT/CN2019/077048, International Search Report and Written Opinion, dated Jul. 19, 2019, (pp. 1-7).
(Continued)

*Primary Examiner* — Michael J Vanchy, Jr.
(74) *Attorney, Agent, or Firm* — Perkins Coie LLP

(57) ABSTRACT

Provided in the present disclosure are an image brightness statistical method and an imaging device, related to the image processing field. The method includes: acquiring the bit width of a pixel brightness value of an image to be processed and a maximum acceptable bit width of a block random access memory; dividing bits of each pixel of said image into multiple groups of bits so that the bit width of each group is less than or equal to the maximum acceptable bit width; performing brightness histogram statistics based on the pixel data of same groups to produce a brightness histogram component corresponding to each group; determining brightness evaluation value components of each groups based on the brightness histogram components corresponding to the groups and the number of pixels of said image; and determining a brightness evaluation value of said image based on the brightness evaluation value components.

20 Claims, 4 Drawing Sheets

(51) Int. Cl.
G06T 1/20 (2006.01)
G06T 1/60 (2006.01)

(56) References Cited

U.S. PATENT DOCUMENTS

| | | | |
|---|---|---|---|
| 2010/0329559 A1* | 12/2010 | Shindo | G06T 5/009 |
| | | | 382/172 |
| 2016/0283810 A1 | 9/2016 | Kobayashi | |
| 2018/0184061 A1* | 6/2018 | Kitsunai | H04N 23/10 |

FOREIGN PATENT DOCUMENTS

| | | |
|---|---|---|
| CN | 105354803 A | 2/2016 |
| CN | 105469373 A | 4/2016 |
| CN | 106162131 A | 11/2016 |
| CN | 106780415 A | 5/2017 |
| CN | 106851138 A | 6/2017 |
| CN | 108475188 A | 8/2018 |
| GB | 2549696 A | 11/2017 |
| WO | 2018067384 A1 | 4/2018 |

OTHER PUBLICATIONS

Chinese Application No. 2018112572118, First Search dated Aug. 17, 2020 (pp. 1-2).
Chinese Application No. 2018112572118, First Office Action dated Aug. 25, 2020, pp. 1-7.

* cited by examiner

IMAGE BRIGHTNESS STATISTICAL METHOD AND IMAGING DEVICE

CROSS-REFERENCE TO RELATED APPLICATIONS

The present disclosure is a continuation of PCT Application No. PCT/CN2019/077048, titled "IMAGE BRIGHTNESS STATISTICAL METHOD AND IMAGING DEVICE", filed on Mar. 5, 2019, which claims priority to Chinese Patent Application No. 201811257211.8, titled "IMAGE BRIGHTNESS STATISTICAL METHOD AND IMAGING DEVICE", filed on Oct. 26, 2018, both of which are incorporated herein by reference in its entirety.

TECHNICAL FIELD

The present disclosure relates to image processing technology, and more particularly, to a method for calculating image brightness and an imaging device.

BACKGROUND

Currently, with the development of intelligent industry, robot obstacle avoidance, simultaneous localization and mapping, and unmanned driving technologies, cameras are widely used in these fields. Current cameras mainly rely on image sensors to obtain image information, and dynamic range is an important parameter of cameras. At present, image sensors of many manufacturers support multi-level exposure to obtain High Dynamic Range (HDR) images. Currently, the dynamic ranges of the HDR images can be up to 120 db. The larger dynamic range means the higher ability to obtain image details. Therefore, in order to obtain HDR images, it is necessary to accurately control the exposure time and gain of the image sensor. The premise of controlling the exposure time and gain of the image sensor is to accurately calculate brightness of a current HDR image. Under normal circumstances, each pixel value of an HDR image will occupy a large bit width, e.g., a bit width of 16 bits to 24 bits. Since each pixel value of an HDR image occupies a large bit width, it is difficult for current hardware technologies such as Field Programmable Gate Array (FPGA), having limited processing capabilities, to calculate brightness of an image with a large bit width (such as an HDR image).

SUMMARY

The embodiments of the present disclosure provide a method for calculating image brightness and an imaging device, capable of solving the problem in the related art associated with the difficulties for current hardware, such as FPGA, having limited processing capabilities, to calculate brightness of an image with a large bit width.

In order to achieve the above object, the following solutions are provided according to the present disclosure.

In an aspect, a method for calculating image brightness is provided according to an embodiment of the present disclosure. The method includes: obtaining a bit width of a pixel value of an image to be processed and a maximum allowable bit width of a block random memory of a hardware device for brightness histogram calculation; dividing each pixel data of the image to be processed into a plurality of groups of pixel data based on the bit width of the pixel value of the image to be processed in such a manner that a bit width of each group of pixel data is smaller than or equal to the maximum allowable bit width; performing brightness histogram calculation based on the pixel data in each group of pixel data to obtain a brightness histogram component corresponding to the group; determining a brightness evaluation value component corresponding to each group based on the brightness histogram component corresponding to the group and a number of pixels in the image to be processed; and determining a brightness evaluation value of the image to be processed based on the respective brightness evaluation value components.

In another aspect, an imaging device is provided according to an embodiment of the present disclosure. The image device includes an image sensor and an image processor. The image sensor is configured to capture an image. The image processor is configured to: obtain the captured image as an image to be processed, and obtain a bit width of a pixel value of the image to be processed and a maximum allowable bit width of a block random memory of a hardware device for brightness histogram calculation; divide each pixel data of the image to be processed into a plurality of groups of pixel data based on the bit width of the pixel value of the image to be processed in such a manner that a bit width of each group of pixel data is smaller than or equal to the maximum allowable bit width; perform brightness histogram calculation based on the pixel data in each group of pixel data to obtain a brightness histogram component corresponding to the group; determine a brightness evaluation value component corresponding to each group based on the brightness histogram component corresponding to the group and a number of pixels in the image to be processed; and determine a brightness evaluation value of the image to be processed based on the respective brightness evaluation value components.

In yet another aspect, a computer readable storage medium is provided according to an embodiment of the present disclosure. The computer readable storage medium has a computer program stored thereon. The program, when executed by a processor, implements the above method for calculating image brightness.

With the method for calculating image brightness and the image device according to the embodiments of the present disclosure, a bit width of a pixel value of an image to be processed and a maximum allowable bit width of a block random memory of a hardware device for brightness histogram calculation can be obtained, and each pixel data of the image to be processed can be divided into a plurality of groups of pixel data based on the bit width of the pixel value of the image to be processed in such a manner that a bit width of each group of pixel data is smaller than or equal to the maximum allowable bit width. Then, brightness histogram calculation can be performed based on the pixel data in each group of pixel data to obtain a brightness histogram component corresponding to the group. Next, a brightness evaluation value component corresponding to each group can be determined based on the brightness histogram component corresponding to the group and a number of pixels in the image to be processed. A brightness evaluation value of the image to be processed can be determined based on the respective brightness evaluation value components. With the embodiments of the present disclosure, it is possible to calculate brightness of an image with a large bit width conveniently to obtain a brightness evaluation value, without being restricted by processing capabilities of existing hardware devices.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures:

FIG. 4 (B) is a schematic diagram showing a brightness histogram component corresponding to Group B;

FIG. 4 (C) is a schematic diagram showing a brightness histogram component corresponding to Group C.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to facilitate understanding of the present disclosure, the technical terms used in the present disclosure will be explained below:

FPGA: Field-Programmable Gate Array, a semi-customized circuit in the field of Application Specific Integrated Circuit (ASIC).

Block RAM: Block Random Access Memory, also referred to as "block random memory", a small internal memory in an FPGA that is used for constructing a data cache.

floor: an operation of rounding down.

HDR: High Dynamic Range images. Compared with an ordinary image, an HDR image can provide a larger dynamic range and more image details. From Low Dynamic Range (LDR) images with different exposure time, the LDR images with best details corresponding to respective exposure time can be combined to obtain a final HDR image, which can better reflect visual effects in a real-world environment.

Figure 1:
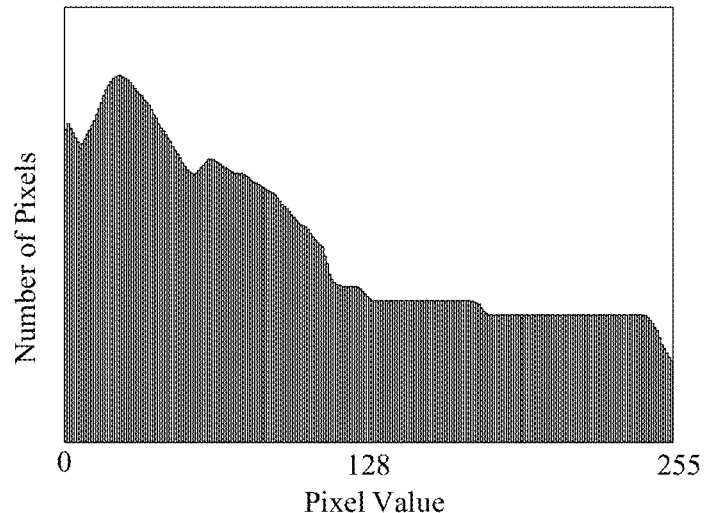
FIG. 1 is a schematic diagram showing a brightness histogram for an 8-bit image.

In the process of implementing the embodiments of the present disclosure, the inventor found that the FPGA-based method for calculating image brightness in the related art typically calculates a brightness histogram for an image with a smaller bit width (for example, 8 bits, 10 bits, or 12 bits), and then calculates a brightness evaluation value of the image. In the process of calculating the brightness histogram, a block RAM in an FPGA is typically used to store histogram data while the image is being captured. The block RAM can be simply understood as a small internal memory for which storage is controlled by an input address and data. For example, a pixel value can be used as an address of the Block RAM. Each time pixel data is generated, the value in the Block RAM storage space with the pixel value of the pixel data as the address can be incremented by 1. When the capturing of one frame of image is completed, the brightness histogram is generated accordingly. For example, FIG. 1 is a brightness histogram for an 8-bit image, in which the abscissa represents addresses constituted by respective pixel values (0 to 255 in decimal, or 00000000 to 11111111 in binary), and the ordinate represents numbers of pixels. In one frame of image, a sum of numbers of pixels at the respective addresses should be equal to the number of pixels in the frame of image. For a frame of 1920*1080 image as an example, the sum of the numbers of pixels at the respective addresses is 2073600.

For hardware devices, such as FPGAs, Block RAM resources are limited and very precious. Assuming that the pixel value of the image has a bit width of x bits, the addressable range of each address in the Block RAM is 0~$2^x-1$. For an image having a resolution of X*Y, each address in the Block RAM for storing a brightness histogram needs to store N bits, where N=floor ($\log_2(X*Y)$)+1. For example, if x=12, X*Y is 1920*1080, then N=21. The required block RAM size is $2^{12}*21$ bits, i.e., 84 Kbits, which is acceptable for most FPGAs. However, for an HDR image, the pixel value of the image may have a bit width of 24 bits. In order to use the above method for histogram calculation, with the same resolution as described above, the required Block RAM space would be $2^{24}*21$ bits, i.e., 336 Mbits, which is almost impossible for most FPGAs. Therefore, how to calculate brightness of an image with a large pixel value bit width has become a problem to be solved.

Figure 2:
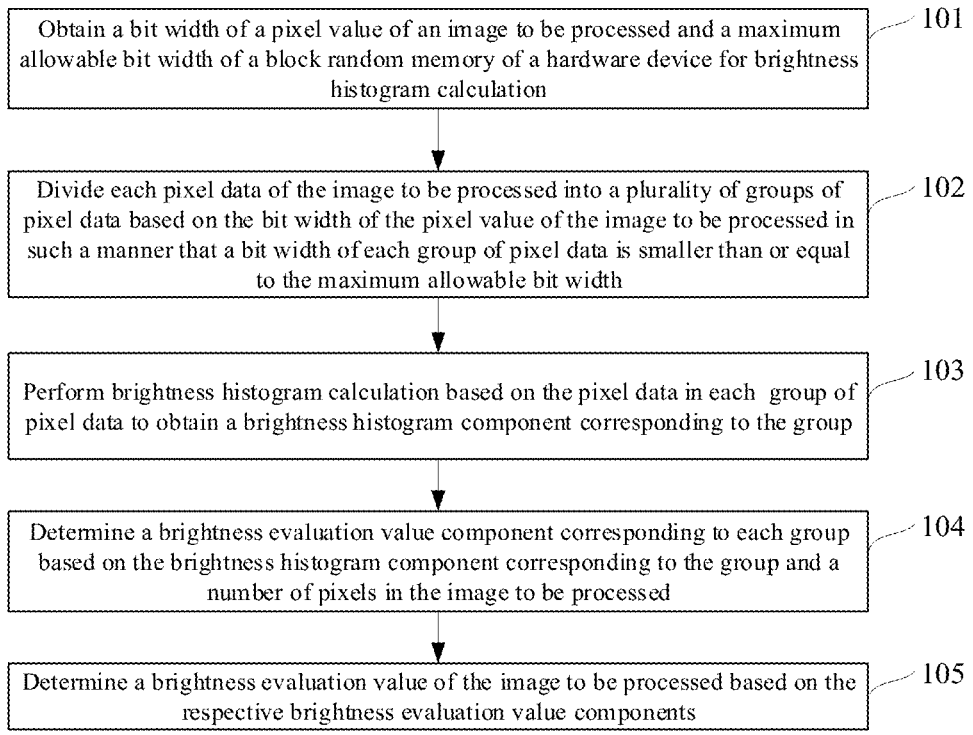
FIG. 2 is a flowchart illustrating a method for calculating image brightness according to an embodiment of the present disclosure.

In order to overcome the above problem, as shown in FIG. 2, an embodiment of the present disclosure provides a method for calculating image brightness, including the following steps.

At step 101, a bit width of a pixel value of an image to be processed and a maximum allowable bit width of a block random memory of a hardware device for brightness histogram calculation are obtained.

At step 102, each pixel data of the image to be processed is divided into a plurality of groups of pixel data based on the bit width of the pixel value of the image to be processed in such a manner that a bit width of each group of pixel data is smaller than or equal to the maximum allowable bit width.

At step 103, brightness histogram calculation is performed based on the pixel data in each group of pixel data to obtain a brightness histogram component corresponding to the group.

At step 104, a brightness evaluation value component corresponding to each group is determined based on the brightness histogram component corresponding to the group and a number of pixels in the image to be processed.

At step 105, a brightness evaluation value of the image to be processed is determined based on the respective brightness evaluation value components.

It can be seen that, with the method for calculating image brightness according to the embodiment of the present disclosure, it is possible to calculate brightness of an image with a large bit width conveniently to obtain a brightness evaluation value, without being restricted by processing capabilities of existing hardware devices.

Figure 3:
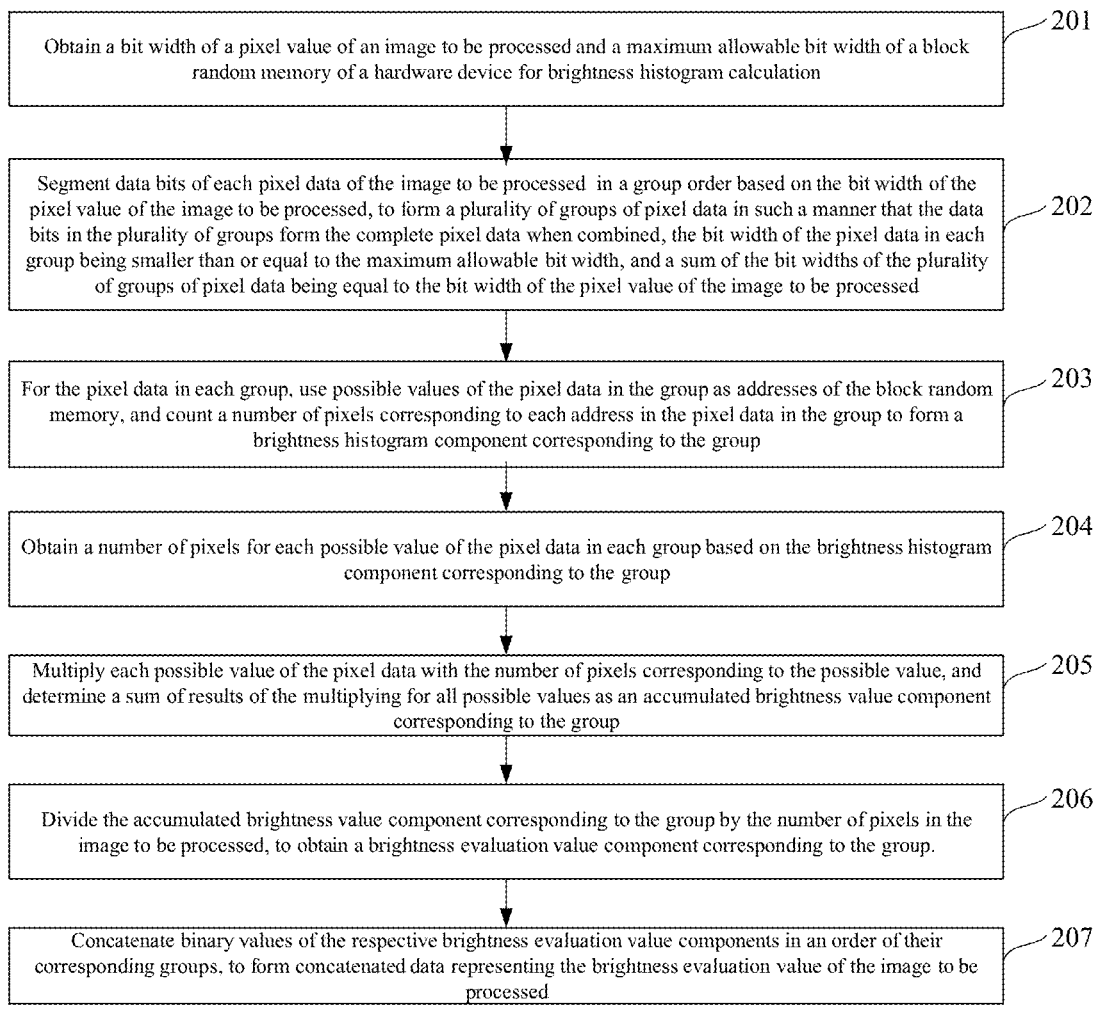
FIG. 3 is another flowchart illustrating a method for calculating image brightness according to an embodiment of the present disclosure.

In order to enable those skilled in the art to better understand the present disclosure, a more detailed embodiment will be given below. As shown in FIG. 3, an embodiment of the present disclosure provides a method for calculating image brightness, including the following steps.

At step 201, a bit width of a pixel value of an image to be processed and a maximum allowable bit width of a block random memory of a hardware device for brightness histogram calculation are obtained.

The image to be processed here may be an HDR image. The bit width of the pixel value of the image to be processed may be 24 bits, 20 bits, or 16 bits, as non-limiting examples. The maximum allowable bit width here depends on the processing performance of different hardware devices. For example, currently when an FPGA is used to calculate a brightness histogram, generally the bit width of the pixel value of the image to be processed would not exceed 16 bits, then the maximum allowable bit width for the FPGA can be 16 bits. It is to be noted that, with the development of hardware technology, the maximum allowable bit width may continuously increase, and it is not limited to bit widths such as 16 bits, 20 bits, or 24 bits.

At step 202, data bits of each pixel data of the image to be processed are segmented in a group order based on the bit width of the pixel value of the image to be processed, to form a plurality of groups of pixel data in such a manner that the data bits in the plurality of groups form the complete pixel data when combined. The bit width of the pixel data in each group is smaller than or equal to the maximum allowable bit width, and a sum of the bit widths of the plurality of groups of pixel data is equal to the bit width of the pixel value of the image to be processed.

It is to be noted that the pixel data of each pixel in the image to be processed is composed of values having a certain bit width. For example, for a 24-bit image to be processed, the pixel data of a certain pixel may be: 101100110011000100010000.

Here, each pixel data can be divided into groups in the same way. For example, when the maximum allowable bit width is 16 bits, the above 24-bit image to be processed can be divided into groups in a variety of ways, so as to segment the data bits of each pixel data in the group order.

For example, 24 bits may be divided into three groups of 10 bits, 10 bits, and 4 bits, respectively. Taking the pixel data of the above pixel as an example, the result of segmentation of the data bits may be: 1011001100 | 1100010001 | 0000.

In another example, 24 bits may be divided into five groups of 5 bits, 5 bits, 5 bits, 5 bits, and 4 bits, respectively. Taking the pixel data of the above pixel as an example, the result of segmentation of the data bits may be: 10110 | 01100 | 11000 | 10001 | 0000.

In yet another example, 24 bits may be divided into four groups of 6 bits, 6 bits, 6 bits, and 6 bits, respectively. Taking the pixel data of the above pixel as an example, the result of segmentation of the data bits may be: 101100 | 110011 | 000100 | 010000.

Here, in order to facilitate processing by a hardware device, such as an FPGA, and the subsequent brightness histogram calculation, such that the process of brightness histogram calculation can be reused, preferably the data bits of each pixel data of the image to be processed can be segmented uniformly in a group order to form the plurality of groups of pixel data having equal data bit widths, and the data bit widths may be an integer power of 2. For example, when the image to be processed is an HDR image having a bit width of the pixel value being 24 bits, then the data bits of each pixel data of the image to be processed can be segmented in a group order to form three groups of 8-bit pixel data. Taking the pixel data of the above pixel as an example, the result of segmentation of the data bits may be: 10110011 | 00110001 | 00010000.

Here, let P denote the pixel data of a certain pixel of the image to be processed with a bit width of 24 bits, and A, B, and C denote the highest 8 bits, the middle 8 bits and the lowest 8 bits of P, respectively. Here, A represents high brightness information in the image, B represents middle brightness information in the image, and C represents low brightness information in the image. In this case the following equation applies: $P=A*2^{16}+B*2^8+C$ That is, in the result of the above data bit segmentation, A is 10110011, B is 00110001, and C is 00010000. If A, B, and C can be combined into P, then 10110011 in A needs to be left-shifted by 16 bits, 00110001 in B needs to be left-shifted by 8 bits, and 00010000 in C is not shifted.

In another example, when the bit width of the pixel value of the image to be processed is 20 bits, for each pixel data, five groups of 4-bit pixel data can be formed. In yet another example, when the bit width of the pixel value to be processed is 16 bits, for each pixel data, two groups of 8-bit pixel data or four groups of 4-bit pixel data can be formed. There may be other bit widths of the pixel values of other images to be processed, and there may also be other ways to segment the data bits, and details thereof will be omitted here.

It can be seen that, with the step 202 here, the pixel data with a large bit width can be segmented into a number of parts of pixel data with a small bit width, so as to facilitate processing in subsequent steps.

At step 203, for the pixel data in each group, possible values of the pixel data in the group are used as addresses of the block random memory, and a number of pixels corresponding to each address in the pixel data in the group is counted to form a brightness histogram component corresponding to the group.

Here, the brightness histogram component includes the number of pixels for each possible value of the pixel data.

Here, the possible values of the pixel data in the group depends on the bit width of the data bits in the group. For example, for a group of 8-bit pixel data, the pixel data in the group may have 256 possible values, i.e., ranging from 0 to $2^8-1$, that is, from 00000000 to 11111111 in binary or from 0 to 255 in decimal. It is to be noted that the brightness histogram component is only brightness histogram component data composed of one group of pixel data, rather than a real brightness histogram for the original image to be processed with the bit width of 24 bits, and cannot be converted into the real brightness histogram.

Figure 4A:
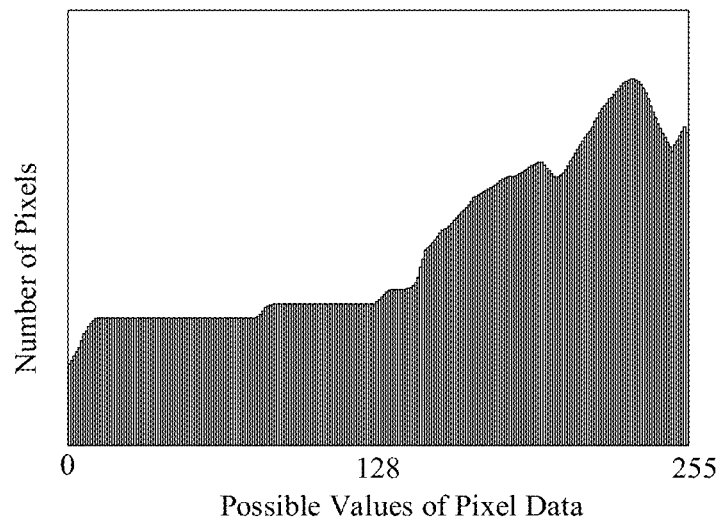
FIG. 4 (A) is a schematic diagram showing a brightness histogram component corresponding to Group A.
Figure 4B:
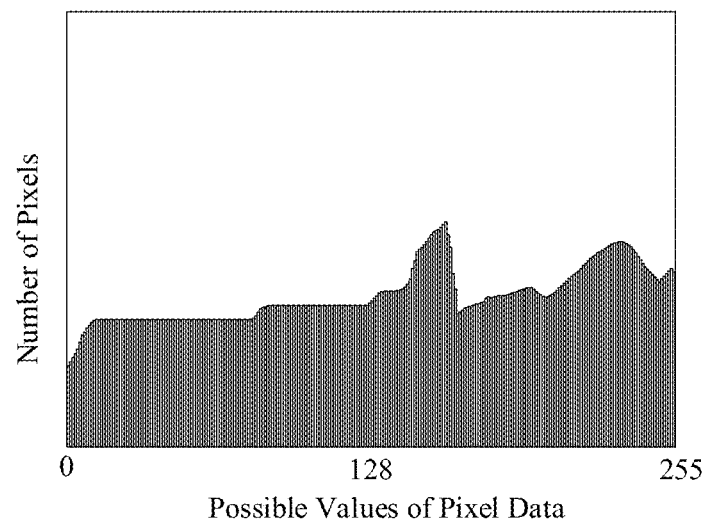
Figure 4C:
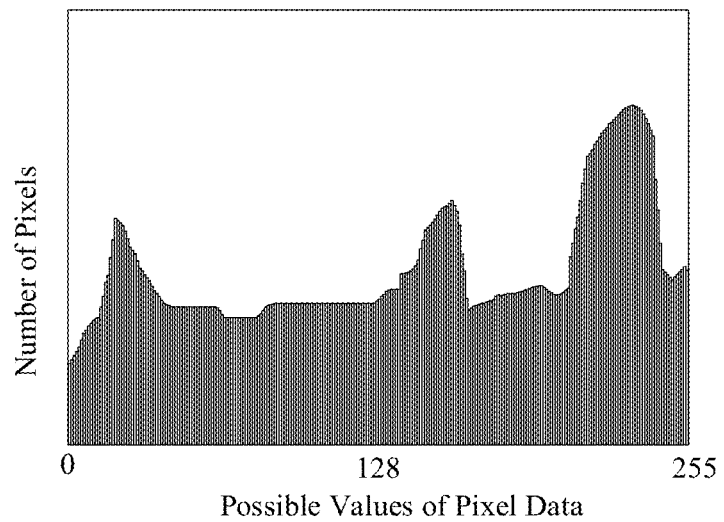

For example, for an image to be processed with a bit width of 24 bits and a resolution of 1920*1080, after obtaining three groups of 8-bit pixel data, e.g., Group A, Group B, and Group C, the respective brightness histogram components for the three groups may be shown in FIG. 4 (A), FIG. 4 (B), and FIG. 4 (C), in which the ordinate represents numbers of pixels and the abscissa represents possible values of the pixel data. For each pixel data in the same group, one Block RAM can be used for calculation of the brightness histogram components. Therefore, for an HDR image having a bit width of 24 bits, only three Block RAMs would be enough for calculation of the brightness histogram components. Compared with an ordinary image having a bit width of 8 bits, only three times more Block RAM resources are to be occupied, which represents a relatively low computational complexity.

At step 204, a number of pixels for each possible value of the pixel data in each group is obtained based on the brightness histogram component corresponding to the group.

In particular, when each pixel data is obtained, the value in the Block RAM storage space having an address equal to the value corresponding to the pixel data is incremented by 1, so as to finally obtain the number of pixels for each possible value of the pixel data.

At step 205, each possible value of the pixel data is multiplied with the number of pixels corresponding to the possible value, and a sum of results of the multiplying for all possible values is determined as an accumulated brightness value component corresponding to the group.

At step 206, the accumulated brightness value component corresponding to the group is divided by the number of pixels in the image to be processed, to obtain a brightness evaluation value component corresponding to the group.

For the above steps 205 to 206, e.g., for the above image to be processed with the bit width of 24 bits, the data bits of each pixel data in the image are segmented into three groups of 8-bit pixel data, i.e., A, B, and C, respectively, then the brightness evaluation value component corresponding to Group A is Lum_A, the brightness evaluation value component corresponding to Group B is Lum_B, and the brightness evaluation value component corresponding to Group C is Lum_C. Then:

$$Lum\_A = \frac{\sum_{i=0}^{255}(Hist\_A[i])*i}{Width*Height},$$

$$Lum\_B = \frac{\sum_{i=0}^{255}(Hist\_B[i])*i}{Width*Height}, \text{ and}$$

$$Lum\_C = \frac{\sum_{i=0}^{255}(Hist\_C[i])*i}{Width*Height},$$

where Hist_A[i] represents the number of pixels for the possible value i of the pixel data in Group A; Hist_B[i] represents the number of pixels for the possible value i of the pixel data in Group B; Hist_C[i] represents the number of pixels for the possible value i of the pixel data in Group C; and Width*Height represents the number of pixels in the image to be processed (that is, if the resolution of the image to be processed is 1920*1080, then the number of pixels is 1920*1080=2073600).

At step 207, binary values of the respective brightness evaluation value components are concatenated in an order of their corresponding groups, to form concatenated data representing the brightness evaluation value of the image to be processed.

For example, as described above, the brightness evaluation value component corresponding to Group A is Lum_A, the brightness evaluation value component corresponding to Group B is Lum_B, and the brightness evaluation value component corresponding to Group C is Lum_C. For example, Lum_A=128, Lum_B=100, and Lum_C=66, i.e., Lum_A=10000000, Lum_B=01100100, and Lum_C=01000010 in binary values. Then, according to the group order of A, B, and C, the binary values can be concatenated into 100000000110010001000010, i.e., 8414274 in decimal, which can represent the brightness evaluation value of the image to be processed. For the brightness evaluation value of the image to be processed, the following equation can also be used. For example, if the brightness evaluation value of the image to be processed is Lum, then Lum=Lum_A*$2^{16}$+Lum_B*$2^8$+Lum_C that is, Lum is 8414274.

Figure 5:
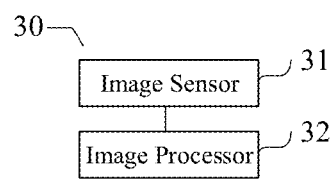
FIG. 5 is a schematic diagram showing a structure of an imaging device according to an embodiment of the present disclosure.

Correspondingly to the method embodiments shown in FIG. 2 and FIG. 3, as shown in FIG. 5, an embodiment of the present disclosure also provides an imaging device 30, including: an image sensor 31 and an image processor 32.

The image sensor 31 is configured to capture an image.

The image processor 32 is configured to: obtain the captured image as an image to be processed, and obtain a bit width of a pixel value of the image to be processed and a maximum allowable bit width of a block random memory of a hardware device for brightness histogram calculation; divide each pixel data of the image to be processed into a plurality of groups of pixel data based on the bit width of the pixel value of the image to be processed in such a manner that a bit width of each group of pixel data is smaller than or equal to the maximum allowable bit width; perform brightness histogram calculation based on the pixel data in each group of pixel data to obtain a brightness histogram component corresponding to the group; determine a brightness evaluation value component corresponding to each group based on the brightness histogram component corresponding to the group and a number of pixels in the image to be processed; and determine a brightness evaluation value of the image to be processed based on the respective brightness evaluation value components.

In addition, the image processor 32 can be configured to: segment data bits of each pixel data of the image to be processed in a group order based on the bit width of the pixel value of the image to be processed, to form the plurality of groups of pixel data in such a manner that the data bits in the plurality of groups form the complete pixel data when combined. The bit width of the pixel data in each group is smaller than or equal to the maximum allowable bit width, and a sum of the bit widths of the plurality of groups of pixel data is equal to the bit width of the pixel value of the image to be processed.

In addition, the image processor 32 can be configured to: for the pixel data in the group, use possible values of the pixel data in the group as addresses of the block random memory, and count a number of pixels corresponding to each address in the pixel data in the group to form the brightness histogram component corresponding to the group. The brightness histogram component includes the number of pixels for each possible value of the pixel data.

In addition, the image processor 32 can be configured to: obtain a number of pixels for each possible value of the pixel data in the group based on the brightness histogram component corresponding to the group; multiply each possible value of the pixel data with the number of pixels corresponding to the possible value, and determining a sum of results of the multiplying for all possible values as an accumulated brightness value component corresponding to the group; and divide the accumulated brightness value component corresponding to the group by the number of pixels in the image to be processed, to obtain the brightness evaluation value component corresponding to the group.

In addition, the image processor 32 can be configured to: concatenate binary values of the respective brightness evaluation value components in an order of their corresponding groups, to form concatenated data representing the brightness evaluation value of the image to be processed.

In addition, the bit width of the pixel value of the image to be processed can be 24 bits.

The image processor 32 can be configured to: segment data bits of each pixel data of the image to be processed in a group order to form three groups of 8-bit pixel data.

In addition, the image processor 32 can be configured to: segment data bits of each pixel data of the image to be processed uniformly in a group order to form the plurality of groups of pixel data having equal data bit widths.

In addition, the data bit widths can be an integer power of 2.

In addition, the image processor 32 can be an FPGA.

The image to be processed can be an HDR image.

In addition, the image sensor 31 can be configured to capture the image to obtain original image data, and combine the original image data to obtain the HDR image.

The image processor 32 can be configured to obtain the HDR image from the image sensor.

Alternatively, the image sensor 31 can be configured to capture the image to obtain original image data.

The image processor 32 can be configured to obtain the original image data from the image sensor, and combine the original image data to obtain the HDR image.

In addition, an embodiment of the present disclosure also provides a computer readable storage medium having a computer program stored thereon. The program, when executed by a processor, implements the above method for calculating image brightness corresponding to FIG. 2 or FIG. 3.

In summary, with the method for calculating image brightness and the image device according to the embodiments of the present disclosure, a bit width of a pixel value of an image to be processed and a maximum allowable bit width of a block random memory of a hardware device for brightness histogram calculation can be obtained, and each pixel data of the image to be processed can be divided into a plurality of groups of pixel data based on the bit width of the pixel value of the image to be processed in such a manner that a bit width of each group of pixel data is smaller than or equal to the maximum allowable bit width. Then, brightness histogram calculation can be performed based on the pixel data in each group of pixel data to obtain a brightness histogram component corresponding to the group. Next, a brightness evaluation value component corresponding to each group can be determined based on the brightness histogram component corresponding to the group and a number of pixels in the image to be processed. A brightness evaluation value of the image to be processed can be determined based on the respective brightness evaluation value components. With the embodiments of the present disclosure, it is possible to calculate brightness of an image with a large bit width conveniently to obtain a brightness evaluation value, without being restricted by processing capabilities of existing hardware devices. In addition, the method for calculating image brightness according to the embodiment of the present disclosure is simple to implement, and can be easily implemented in a Hardware Description Language (HDL), such as Verilog HDL or Very-High-Speed Integrated Circuit Hardware Description Language (VHDL).

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for calculating image brightness, comprising:
    obtaining a bit width of a pixel brightness value of an image to be processed and a maximum allowable bit width of a block random access memory of a hardware device for brightness histogram calculation, wherein each pixel brightness value is represented by data with a plurality of bits, and the number of the plurality of bits is equal to the bit width of a pixel brightness value;
    dividing bits of each pixel of the image to be processed into a plurality of groups based on the bit width of the pixel brightness value of the image to be processed in such a manner that a number of bits of each group is smaller than or equal to the maximum allowable bit width;
    performing brightness histogram calculation based on the data of each group of bits to obtain a brightness histogram component corresponding to the group;
    determining a brightness evaluation value component corresponding to each group based on the brightness histogram component corresponding to the group and a number of pixels in the image to be processed; and
    determining a brightness evaluation value of the image to be processed based on the respective brightness evaluation value components.

2. The method of claim 1, wherein said dividing bits of each pixel of the image to be processed into the plurality of groups of bits based on the bit width of the pixel brightness value of the image to be processed in such a manner that a number of bits of each group is smaller than or equal to the maximum allowable bit width comprises:
    segmenting data bits of each pixel data of the image to be processed in a group order based on the bit width of the pixel brightness value of the image to be processed, to form the plurality of groups of pixel data in such a manner that the data bits in the plurality of groups form the complete pixel data when combined, wherein the bit width of the pixel data in each group is smaller than or equal to the maximum allowable bit width, and a sum of the bit widths of the plurality of groups of pixel data is equal to the bit width of the pixel brightness value of the image to be processed.

3. The method of claim 1, wherein said performing the brightness histogram calculation based on the data of each group of bits to obtain the brightness histogram component corresponding to the group comprises:
    for the pixel data in the group, using possible values of the pixel data in the group as addresses of the block random access memory, and counting a number of pixels corresponding to each address in the pixel data in the group to form the brightness histogram component corresponding to the group, the brightness histogram component including the number of pixels for each possible value of the pixel data.

4. The method of claim 1, wherein said determining the brightness evaluation value component corresponding to each group based on the brightness histogram component corresponding to the group and the number of pixels in the image to be processed comprises:
    obtaining a number of pixels for each possible value of the pixel data in the group based on the brightness histogram component corresponding to the group;
    multiplying each possible value of the pixel data with the number of pixels corresponding to the possible value, and determining a sum of results of the multiplying for all possible values as an accumulated brightness value component corresponding to the group; and
    dividing the accumulated brightness value component corresponding to the group by the number of pixels in the image to be processed, to obtain the brightness evaluation value component corresponding to the group.

5. The method of claim 1, wherein said determining the brightness evaluation value of the image to be processed based on the respective brightness evaluation value components comprises:
    concatenating binary values of the respective brightness evaluation value components in an order of their corresponding groups, to form concatenated data representing the brightness evaluation value of the image to be processed.

6. The method of claim 1, wherein the bit width of the pixel brightness value of the image to be processed is 24 bits, and
    said dividing bits of each pixel of the image to be processed into the plurality of groups comprises: segmenting each pixel data of the image to be processed in a group order to form three groups of 8-bit pixel data.

7. The method of claim 1, wherein said dividing bits of each pixel of the image to be processed into the plurality of groups comprises:
    segmenting data bits of each pixel data of the image to be processed uniformly in a group order to form the plurality of groups of pixel data having equal data bit widths.

8. The method of claim 7, wherein the data bit widths are an integer power of 2.

9. The method of claim 1, wherein the image processor is a Field Programmable Gate Array (FPGA) and the image to be processed is a High Dynamic Range (HDR) image.

10. An imaging device, comprising an image sensor and an image processor, wherein the image sensor is configured to capture an image, and the image processor is configured to:
    obtain the captured image as an image to be processed, and obtain a bit width of a pixel brightness value of the image to be processed and a maximum allowable bit width of a block random access memory of a hardware device for brightness histogram calculation, wherein each pixel brightness value is represented by data with a plurality of bits, and the number of the plurality of bits is equal to the bit width;
    divide bits of each pixel of the image to be processed into a plurality of groups based on the bit width of the pixel brightness value of the image to be processed in such a manner that a number of bits of each group is smaller than or equal to the maximum allowable bit width;

perform brightness histogram calculation based on the data of each group of bits to obtain a brightness histogram component corresponding to the group;

determine a brightness evaluation value component corresponding to each group based on the brightness histogram component corresponding to the group and a number of pixels in the image to be processed; and determine a brightness evaluation value of the image to be processed based on the respective brightness evaluation value components.

11. The imaging device of claim 10, wherein the image processor is configured to:

segment data bits of each pixel data of the image to be processed in a group order based on the bit width of the pixel brightness value of the image to be processed, to form the plurality of groups of pixel data in such a manner that the data bits in the plurality of groups form the complete pixel data when combined, wherein the bit width of the pixel data in each group is smaller than or equal to the maximum allowable bit width, and a sum of the bit widths of the plurality of groups of pixel data is equal to the bit width of the pixel brightness value of the image to be processed.

12. The imaging device of claim 10, wherein the image processor is configured to:

for the pixel data in the group, use possible values of the pixel data in the group as addresses of the block random access memory, and count a number of pixels corresponding to each address in the pixel data in the group to form the brightness histogram component corresponding to the group, the brightness histogram component including the number of pixels for each possible value of the pixel data.

13. The imaging device of claim 10, wherein the image processor is configured to:

obtain a number of pixels for each possible value of the pixel data in the group based on the brightness histogram component corresponding to the group;

multiply each possible value of the pixel data with the number of pixels corresponding to the possible value, and determining a sum of results of the multiplying for all possible values as an accumulated brightness value component corresponding to the group; and divide the accumulated brightness value component corresponding to the group by the number of pixels in the image to be processed, to obtain the brightness evaluation value component corresponding to the group.

14. The imaging device of claim 10, wherein the image processor is configured to:

concatenate binary values of the respective brightness evaluation value components in an order of their corresponding groups, to form concatenated data representing the brightness evaluation value of the image to be processed.

15. The imaging device of claim 10, wherein the image processor is configured to:

segment data bits of each pixel data of the image to be processed uniformly in a group order to form the plurality of groups of pixel data having equal data bit widths.

16. The imaging device of claim 10, wherein the image to be processed is a High Dynamic Range (HDR) image.

17. The imaging device of claim 16, wherein the image sensor is configured to capture the image to obtain original image data, and combine the original image data to obtain the HDR image, and the image processor is configured to obtain the HDR image from the image sensor.

18. The imaging device of claim 16, wherein the image sensor is configured to capture the image to obtain original image data, and the image processor is configured to obtain the original image data from the image sensor, and combine the original image data to obtain the HDR image.

19. A non-transitory computer readable storage medium, having a computer program stored thereon, wherein the program, when executed by a processor, implements a method for calculating image brightness, the method comprising:

obtaining a bit width of a pixel brightness value of an image to be processed and a maximum allowable bit width of a block random access memory of a hardware device for brightness histogram calculation, wherein each pixel brightness value is represented by data with a plurality of bits, and the number of the plurality of bits is equal to the bit width;

dividing bits of each pixel of the image to be processed into a plurality of groups based on the bit width of the pixel brightness value of the image to be processed in such a manner that a number of bits of each group is smaller than or equal to the maximum allowable bit width;

performing brightness histogram calculation based on the data of each group of bits to obtain a brightness histogram component corresponding to the group;

determining a brightness evaluation value component corresponding to each group based on the brightness histogram component corresponding to the group and a number of pixels in the image to be processed; and determining a brightness evaluation value of the image to be processed based on the respective brightness evaluation value components.

20. The non-transitory computer readable storage medium in claim 19, wherein said dividing bits of each pixel of the image to be processed into the plurality of groups of bits based on the bit width of the pixel brightness value of the image to be processed in such a manner that a number of bits of each group is smaller than or equal to the maximum allowable bit width comprises:

segmenting data bits of each pixel data of the image to be processed in a group order based on the bit width of the pixel brightness value of the image to be processed, to form the plurality of groups of pixel data in such a manner that the data bits in the plurality of groups form the complete pixel data when combined, wherein the bit width of the pixel data in each group is smaller than or equal to the maximum allowable bit width, and a sum of the bit widths of the plurality of groups of pixel data is equal to the bit width of the pixel brightness value of the image to be processed.

* * * * *